(12) United States Patent
Lang

(10) Patent No.: US 6,793,047 B2
(45) Date of Patent: Sep. 21, 2004

(54) HYDRAULIC DASHPOT

(76) Inventor: Steffen Lang, Sauerlandstr. 1, D-58256 Ennepetal (DE)

(*) Notice: Subject to any disclaimer, the term of this patent is extended or adjusted under 35 U.S.C. 154(b) by 0 days.

(21) Appl. No.: 10/442,906

(22) Filed: May 21, 2003

(65) Prior Publication Data
US 2003/0221923 A1 Dec. 4, 2003

(30) Foreign Application Priority Data
May 28, 2002 (DE) .......................... 102 23 556

(51) Int. Cl.[7] .................................. F16F 9/34
(52) U.S. Cl. ................. 188/266.4; 188/266.3; 188/266.5
(58) Field of Search ............. 188/266.3, 266.4, 188/266.5, 282.1, 282.2, 282.6, 282.7, 285, 286, 289, 322.22, 282.4; 267/64.16, 64.12, 126

(56) References Cited

U.S. PATENT DOCUMENTS

| | | | | |
|---|---|---|---|---|
| 4,530,425 A | * | 7/1985 | Veaux et al. | 188/266.4 |
| 4,596,320 A | * | 6/1986 | Shimokura et al. | 188/266.4 |
| 4,620,620 A | * | 11/1986 | Johnston et al. | 188/266.4 |
| 4,754,855 A | * | 7/1988 | Kuwana et al. | 188/266.4 |
| 4,773,635 A | * | 9/1988 | Buma | 267/220 |
| 5,146,948 A | * | 9/1992 | Runkel | 137/493.8 |
| 5,879,137 A | * | 3/1999 | Yie | 417/225 |

* cited by examiner

Primary Examiner—Chris Schwartz
(74) Attorney, Agent, or Firm—Max Fogiel

(57) ABSTRACT

A hydraulic dashpot comprises, first, a cylinder and a piston. The cylinder (1) is charged with shock-absorbing fluid. The piston (3) is provided with ports and valves, is mounted on one end of a piston rod (2) and divides the cylinder into two chambers. The piston rod travels into and out of the cylinder and is provided with a central bore (20). The dashpot also comprises an adjustable bypass accommodated inside the piston rod or inside an extension (7) thereof. The bypass is provided with radial outlets (19, 23, 37) through the piston rod or extension. The cross-section of the bypass during the compression phase can be established independent of its cross-section during the suction phase and vice versa. There are two valves in the end of the piston rod near the piston or in the piston-rod extension. Each valve is provided with a rotating plunger (18, 21, 32, 33) with a rotary connection. Each plunger operates in conjunction with a radial inlet or outlet (19, 23, 27). An axially displaceable control rod (25) with a rotary connection at one or both ends is accommodated inside the bore that extends through the piston rod and can be alternately connected to the plunger connections.

8 Claims, 3 Drawing Sheets

HYDRAULIC DASHPOT

BACKGROUND OF THE INVENTION

The present invention concerns a hydraulic dashpot.

Hydraulic dashpots are employed to attenuate the motions of wheel suspensions articulated by way of springs, preferably in motor vehicles.

The dashpot comprises a cylinder is charged with shock-absorbing fluid and a piston that travels back and forth inside it and divides it into two chambers. The attenuation is created by forcing fluid out of one chamber and into the other through preferably resiliently loaded ports in the piston.

In one known dashpot, bypasses that hydraulically parallel the ports and provide communication between the chambers allow the motion to be attenuated at narrow and precise increments. Bypass cross-sections of different widths are also known for this purpose.

European Patent 1 006 292 A1 discloses a dashpot of this genus. The bypass between the two chambers is accommodated in an axial bore in the piston rod and provided with radial outlets through it. The cross-section of the bypass can be varied by means of a rod that engages a needle valve. The drawback to this embodiment is that only a constant cross-section can be established, and the fluid will flow through the same cross-section no matter whether the piston is traveling in the compression or in the suction direction.

Blocking the fluid as it flows in one direction or the other is also known. The drawback to this approach is that the flow can be controlled in only one direction.

German 10 138 487 discloses a generic hydraulic dashpot wherein the bypass can have one width while the piston rod is traveling in the compression direction and another independent width while it is traveling in the suction direction. Unfortunately, the controls employed for this purpose are extremely complicated. Furthermore, the cross-section of the bypass is established indirectly and is accordingly with considerable difficulty.

SUMMARY OF THE INVENTION

The object of the present invention is a dashpot of the aforesaid genus wherein the bypass cross-section can be easily established manually, whereby both the means of establishment and the overall dashpot are uncomplicated.

The particular advantages of the present invention are, first, that the bypass cross-section associated with the compression phase flow and the bypass cross-section associated with the suction-phase flow can be established entirely independently and, second, that the dashpot is simple in design.

BRIEF DESCRIPTION OF THE DRAWINGS

One embodiment of the present invention will now be specified with reference to the accompanying drawing, wherein.

DESCRIPTION OF TUE PREFERRED EMBODIMENTS

Figure 1:
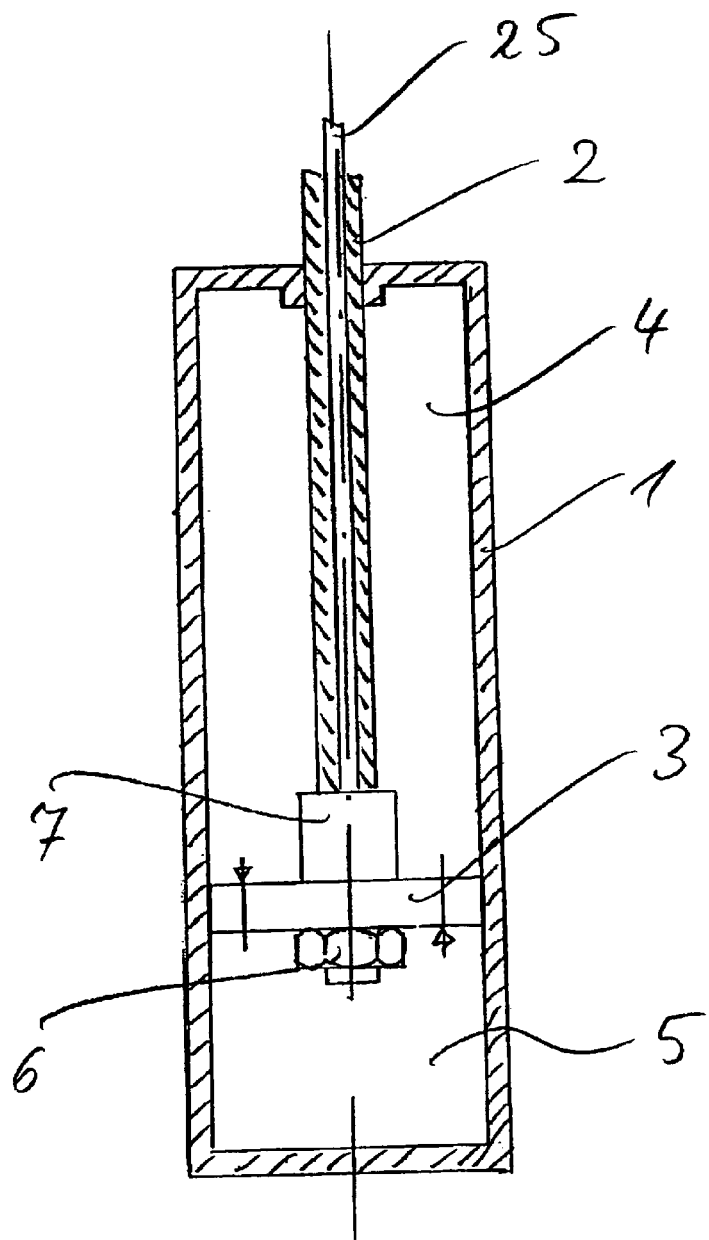
FIG. 1 is a schematic depiction of a dashpot, FIG. 2 a larger-scale depiction of controls mounted on an extension of the piston rod.

The dashpot schematically illustrated in FIG. 1 comprises a cylinder 1 and a piston 3. Cylinder 1 is charged with shock absorbing fluid. Piston 3 separates the interior of cylinder 1 into two chambers 4 and 5 and is mounted at one end of a piston rod 2 that travels into and out of cylinder 1. Piston 3 is provided with unillustrated ports and pressure-decreasing valves.

With piston rod 2 traveling in the suction direction, the shock absorbing fluid will flow through piston 3 out of upper cylinder chamber 4 and into lower cylinder chamber 5 decelerated by the ports and valves. During the compression phase, the fluid will flow through piston 3 from lower cylinder chamber 5 and into upper cylinder chamber 4.

Piston 3 is secured to a section of piston rod 2 provided with unillustrated outside threads by a fastener in the form of a washer and nut 6.

The bypass in the illustrated example is accommodated in an extension 7 of piston rod 2 screwed by way of a schematically depicted threaded section 8 to the piston rod at one end and at the other to piston 3. Piston-rod extension 7 is screwed to piston 3 along a downward-extending bolt 9 provided with a threaded section 10. Nut 6 screws onto threaded section 10. Bolt 9 is part of a housing 11 that accommodates piston-rod extension along with the bypass itself.

If piston rod 2 is thick enough, however, the bypass can alternatively be integrated directly into the piston end of piston rod 2.

Figure 2:
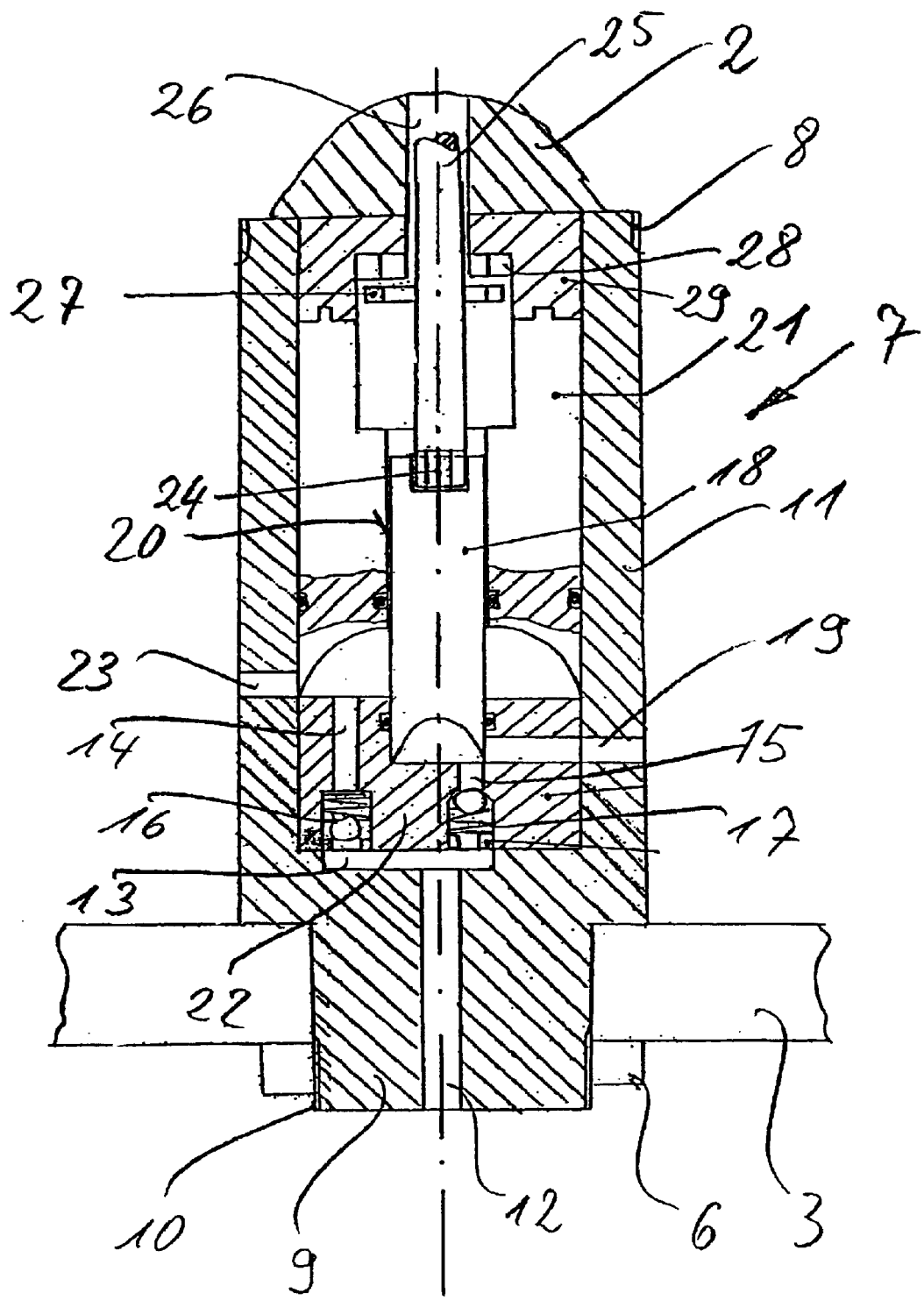

The bypass illustrated in FIG. 2 is fastened to lower cylinder chamber 5 by way of a central bore 12 that communicates with intake bores 14 and 15 by way of a channel 13. Intake bores 14 and 15 are provided with mutually counteracting resiliently loaded checkvalves 16 and 17. These valves can be forced in the form of a finished component into intake bores 14 and 15, which are wider at that point.

Intake bore 15 operates in conjunction with a rotating plunger 18 and a radial outlet 19. As plunger 18 rotates, the entry into radial outlet 19 is more or less closed or opened. Intake bore 15, checkvalve 17, plunger 18, and radial outlet 19 regulate the cross-section of the bypass while piston rod 2 is traveling in the suction direction. With the piston rod traveling in the opposite direction, the bypass is closed.

Rotating plunger 18 is accommodated in housing 11 in a bore 20 that extends through the center of another rotating plunger 21 and through the base 22 of the housing. Like intake bore 15, intake bore 14 extends along with its checkvalve 17 through base 22. Rotating plunger 21 is accommodated inside housing 11, its guiding edge resting against base 22. An associated outlet 23 radially extends through housing 11 at the same level as rotating plunger 21. As plunger 21 rotates, the entry into radial outlet 23 is more or less closed or opened. Intake bore 14, checkvalve 16, plunger 21, and outlet 23 regulate the cross-section of the bypass while piston rod 2 is traveling in the compression direction.

The upper end of rotating plunger 18 is provided with an inner hexagon that is engaged by an outer hexagon 24 on the end of a control rod 25. Control rod 25 extends, as will be evident from FIG. 1, through a bore 26 through the center of piston rod 2 and as far as its upper end and can be accessed from outside.

Control rod 25 can be both rotated and axially displaced, and can accordingly, in its lower position, engage the outer hexagon 24 in rotating plunger 18 and rotate it. Once control rod 25 has been lifted as represented in FIG. 2, there will be no matching fit between the control rod and rotating plunger 18. In this state, a crown gear 27 fastened to control rod 25 engages an inner cogged section 28 of a cap 29 connected to control rod 25. Rotating plunger 21 can now be rotated in either direction by way of control rod 25. To secure the position of control rod 25, it can be constantly subject to a force exerted by an unillustrated spring in the direction illustrated in FIG. 2. Control rod 25 can then be extracted against the force of the spring to adjust the position of rotating plunger 21.

Figure 3:
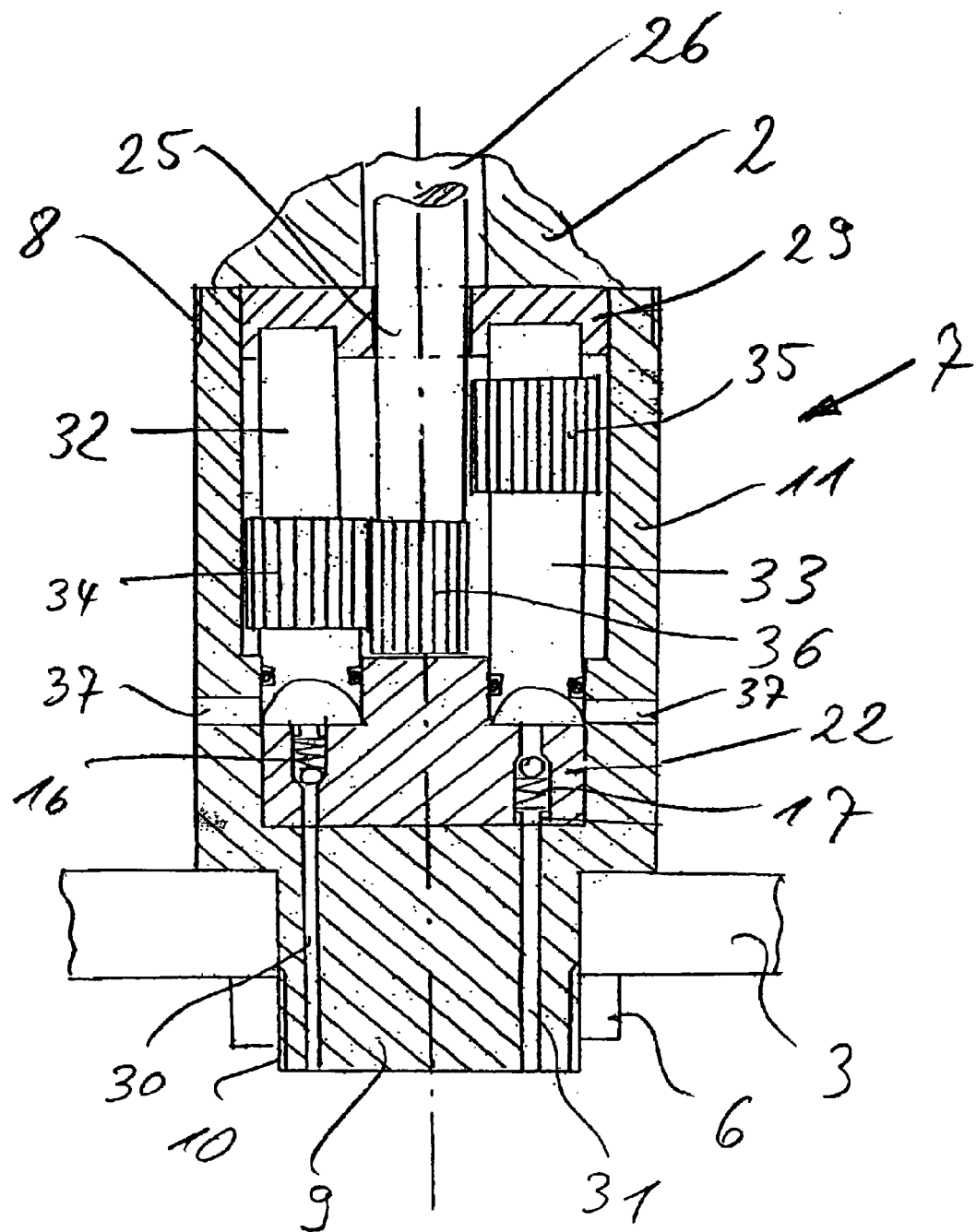
FIG. 3 illustrates another version of the controls depicted in FIG. 2.

The bypass illustrated in FIG. 3 is similar to the one illustrated in FIG. 2. In this version as well, the housing 11 of piston-rod extension 7 accommodates the bypass. The device is also regulated by a control rod 25 that extends through a bore 26 in the piston rod. Only the rotating plunger and bypass channels are different. In the embodiment illustrated in FIG. 3, two bores 30 and 31 extend through the bolt 9 in housing 11 and through base 22. There are again checkvalves 16 and 17 in the vicinity of base 22.

There are rotating plungers 32 and 33 at the outlets from bores 30 and 31 respectively. Rotating plunger 30, depicted at the bottom of FIG. 3, a cogged section 34 and rotating plunger 33 a cogged section 35. Control rod 25 itself is provided with a cogged section 36. As control rod 25 is displaced, its cogged section 36 will accordingly engage either the cogged section 34 of rotating plunger 32 or the cogged section 35 of rotating plunger 33. Displacement of control rod 25 will thus, as in the embodiment illustrated in FIG. 2, allow either rotating plunger 32 or rotating plunger 33 to rotate. The guiding edges of plungers 32 and 33 will in this event regulate the cross-sections of outlets 37.

The rotary connections can also be in the form of claws.

List of Parts 1. cylinder
2. piston rod
3. piston
4. upper cylinder chamber
5. lower cylinder chamber
6. nut
7. piston-rod extension
8. threaded section
9. bolt
10. threaded section
11. housing
12. central bore
13. communicating channel
14. intake bore
15. intake bore
16. checkvalve
17. checkvalve
18. rotating plunger
19. radial outlet
20. bore
21. rotating plunger
22. base
23. rotating plunger
24. outer hexagon
25. control rod
26. bore
27. crown gear
28. inner cogged section
29. cap
30. bore
31. bore
32. rotating plunger
33. rotating plunger
34. cogged section
35. cogged section
36. cogged section
37. outlet

What is claimed is:

1. A hydraulic dashpot comprising: a piston with ports and valves; a cylinder charged with shock-absorbing fluid; said piston traveling into and out of said cylinder and dividing said cylinder into two chambers; a piston rod having a central bore and having an end mounting said piston; an adjustable bypass inside said piston rod and having radial outlets through said piston rod, said bypass having a cross-section during a suction phase, said cross-section during the suction phase being also independent of the cross-section during the compression phase; two valves in said end of said piston rod; a rotating plunger with a rotary connection for each of said valves, and operating in conjunction with one of said outlets; an axially displaceable control rod with two ends and a rotary connection at at least one of said ends inside said bore extending through said piston rod and being connectable to the plunger.

2. A hydraulic dashpot as defined in claim 1, wherein said rotary connection comprises cogwheel means.

3. A hydraulic dashpot as defined in claim 1, wherein said rotary connection comprises claw means.

4. A hydraulic dashpot as defined in claim 1, wherein said rotating plungers are concentric.

5. A hydraulic dashpot comprising: a piston with ports and valves; a cylinder charged with shock-absorbing fluid, said piston traveling into and out of said cylinder and dividing said cylinder into two chambers; a piston rod having a central bore and having an end mounting said piston; a piston rod extension; an adjustable bypass inside said piston rod extension and having radial outlets through said piston rod, said bypass having a cross-section during a suction phase, said cross-section during the suction phase being also independent of the cross-section during the compression phase; two valves in said piston rod extension; a rotating plunger with a rotary connection for each of said valves, and operating in conjunction with one of said outlets; an axially displaceable control rod with two ends and a rotary connection at at least one of said ends inside said bore extending through said piston rod and being connectable to the plunger.

6. A hydraulic dashpot as defined in claim 5, wherein said rotary connection comprises cogwheel means.

7. A hydraulic dashpot as defined in claim 5, wherein said rotary connection comprises claw means.

8. A hydraulic dashpot as defined in claim 5, wherein said rotating plungers are concentric.

* * * * *